Patented June 28, 1927.

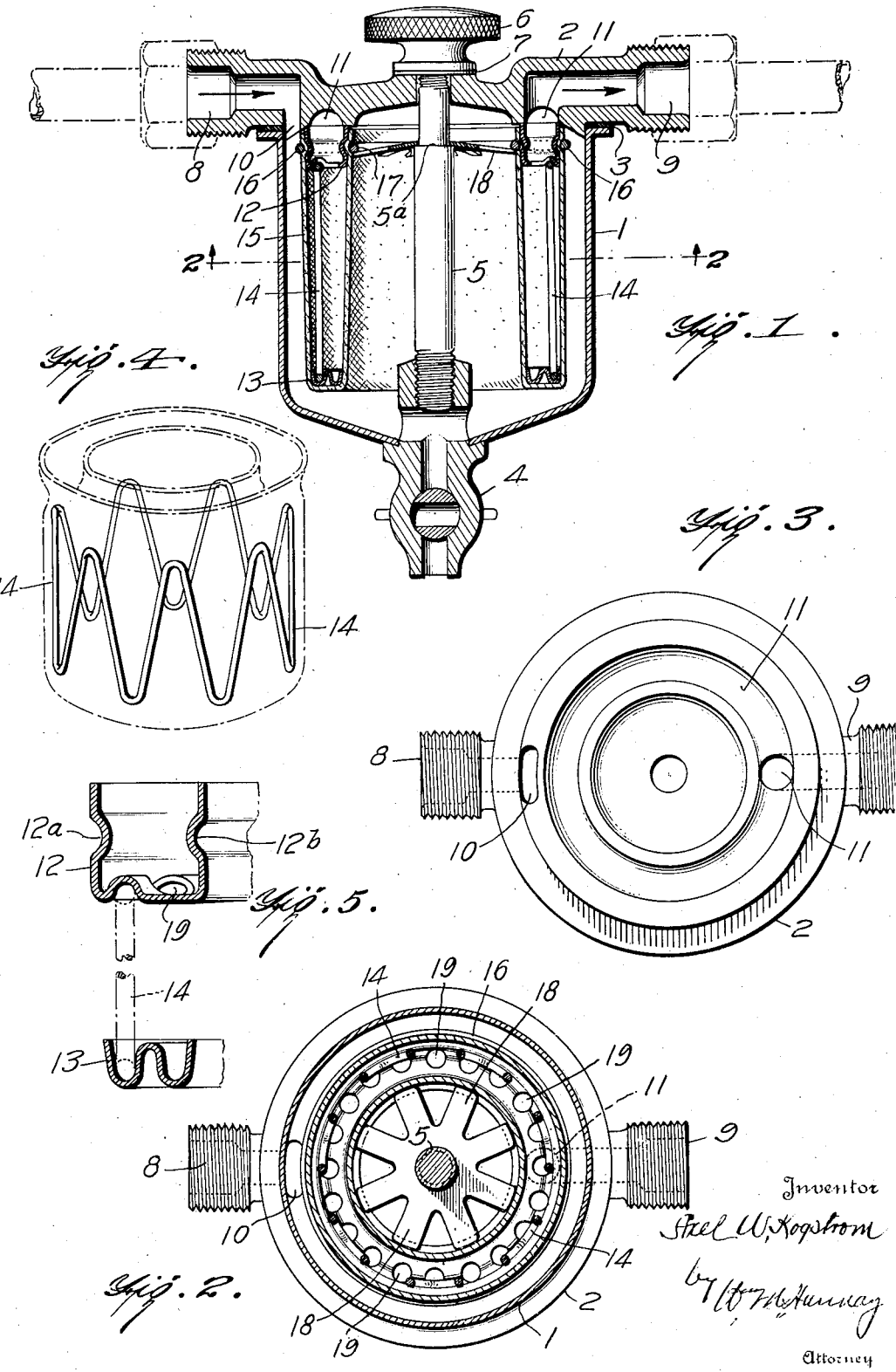

1,633,818

UNITED STATES PATENT OFFICE.

AXEL W. KOGSTROM, OF UPPER DARBY, PENNSYLVANIA, ASSIGNOR OF ONE-HALF TO ALLISON F. H. SCOTT, OF PHILADELPHIA, PENNSYLVANIA.

FILTER.

Application filed June 4, 1925. Serial No. 35,019.

This invention relates to filters and in particular to a filter to be used for filtering out the impurities in the liquid fuel supply for gas engines and the like.

One object of the invention is to produce a self contained filter device which can be readily inserted in the fuel supply pipe of gas engines or any other liquid supply from which impurities are to be removed. It is also an object of the invention to produce such a device with simple construction to facilitate its manufacture, its assembly, and to reduce the number of removable parts to a minimum.

Another object is to construct a filter device in which the filter unit proper is made as a unitary structure which may be readily removed from the filter casing, thus the filter units may be conveniently bought separately and replaceable in the event they become clogged or inefficient after long service.

Another object is to so constructe the filter unit that it will have a relatively large filtering area in comparison with other filters of the same size.

In the drawings:

Fig. 1 is a sectional view showing the assembly of the invention in elevation;

Fig. 2 is a horizontal sectional view taken along line 2—2 of Fig. 1.

Fig. 3 is a view showing the under side of the filter head or cap.

Fig. 4 shows a wire spacing element used in the assembly of the filter unit to aid in maintaining the filtering surfaces in proper relation.

Fig. 5 shows the details of the upper and lower supporting rings upon which the filter material is mounted.

In Fig. 1, the main casing of the filter is in the form of a bowl or cup 1, which may be formed from sheet metal by drawing or otherwise. The bowl is provided with a cover or cap 2, and an air-tight joint is provided between the two by means of the washer 3. A drain cock 4 is soldered or otherwise secured to the bottom of bowl 2, and a rod 5 is securely held in the upper end of cock 4. The upper end of rod 5 extends into the filter casing, through a hole in the cap 2, and is provided with a thumb nut 6 for tightly clamping the cap upon the bowl. A washer 7 is provided under the nut 6 to make an air-tight joint around the hole in the filter cap.

The cap 2 is provided with an inlet passage 8 which communicates directly with the interior of the bowl 1 by means of passage 10. An outlet passage 9 is also provided in cap 2, and is connected at its inner end with an annular groove 11, formed in the under side of the cap and located directly above the filter unit.

The filter unit assembly proper consists of members or elements 12, 13, 14, 15, 16 and 17. In this unit, element 12 is an upper ring of substantially a rectangular cross-section with the upper side open, as shown in Figs. 1 and 5. The upper edges of ring 12 abut against the lower face of cap 2, to form a seal around the annular groove 11. A filter element 15, in the form of a torus-shaped bag, is supported from ring 12 by means of two spring rings 16 and 17 which tightly press the upper edges of the filter bag into grooves 12$^a$ and 12$^b$ arranged respectively on the outer and inner sides of ring 12. This particular form of filter bag affords a filtering surface equal to a plain cylindrical bag having a diameter equal to the mean diameter of the two walls and of twice the length. Thus for any given diameter and length of bowl the torus-shaped bag affords substantially twice as much filtering surface as a plain cylindrical bag. This filter bag is made of chamois or any other suitable filter material. The bag 15 extends downwardly from ring 12, and in order to prevent is from collapsing during operation a lower ring 13, is provided at the bottom of the bag to separate the walls. The lower ring 13 is maintained in spaced relation to the upper ring 12 by means of the resilient spacing element 14, which is set in grooves provided in the rings for this purpose (see Figs. 1 and 5). The element 14 may be made of stiff spring wire or other suitable material.

The filter unit assembly is maintained in position against the under side of cap 2, by means of a spider 18, supported upon a shoulder 5$^a$ formed on rod 5. The outer ends of the fingers of spider 18, engage the under side of clamping ring 17, and press the filter unit tightly against the under side of the cap 2. The spider 18 may be made of any suitable resilient material.

A series of holes 19 are formed around the bottom of ring 12, to provide passage ways from the filter bag 15 to the groove 11 and to the outlet passage 9.

In assembling the filter, the filter unit is first assembled, the spider 18 is then inserted in the filter unit through the bottom and, together with the unit, is slipped over the end of rod 5 and seated on the shoulder 5ª. The cap 2, may then be positioned over the rod 5, after having placed washer 3 in position, and nut 6 is screwed on to the end of rod 5 to force the filter unit down against the tension of spider 18 and to form a tight joint between bowl 1 and cap 2. The abutting surfaces of cap 2 and ring 12 are ground or otherwise machined to afford a tight joint between the two. The nut 6 serves not only to maintain a tight joint between cap 2 and the filter unit, but also between the cap and the bowl.

It will thus be seen that a construction is obtained in which only three principal elements are involved, that is, the bowl, the filter unit and the cap, and only a single fastening means is used to hold these elements in their proper assembled relation.

The operation of the filter is as follows: Fluid to be filtered, such as gasolene, is admitted through the intake passage 8 to the bowl 1. The fluid may be either forced into the bowl under pressure or drawn through by a vacuum. The fluid will completely fill the bowl and will be in contact with the entire outer surface or walls of the filter bag 15. The gasolene will filter to the inside of the bag through both the inner and outer walls, and, under the action of the pumping system, will be either forced or drawn through the holes 19 to groove 11, and thence through the outlet passage 9. Any foreign substances in the fluid will either settle to the bottom of the bowl 1 or be filtered out by the bag 15. Sediment which collects in the bottom of the bowl may be drained off by opening cock 4.

It is apparent that the use of a torus-shaped filter bag, as shown, instead of a plain bag or a cylindical filter surface permits of considerably more filter surface area being enclosed in a casing of any given size.

Should a filter unit become useless for any reason, the construction employed in my invention permits of substituting a new unit without the use of tools of any kind and with greatest dispatch.

What I claim is:

1. A filter comprising a settling chamber and a cap therefor provided with inlet and outlet passages, means for clamping the cap to the chamber, a filter element, and means including said clamping means and a flexible spider supported thereon for resiliently holding the filter element over the outlet passage.

2. A filter comprising a settling chamber and a cap therefor provided with inlet and outlet passages, means for clamping the cap to the chamber, a filter element, and means including said clamping means and a flexible spider supported thereon for positioning the filter element over the outlet passage and resiliently holding it against the cap.

3. A filter unit comprising an upper supporting ring having a cup-shaped cross-section, an annular filter bag supported by its edges from the inner and outer walls of the upper ring, a lower ring in the bottom of the bag, and a spacing element maintaining the two rings in spaced relation.

4. A filter unit comprising a torus-shaped bag open at the top and having two concentric cylindrical walls of filter material, an annular ring inserted in the open space between said walls at the upper end thereof and holding said walls in spaced relation, a similar ring inserted between the walls at the lower end thereof, the lower one of said rings being imperforate while the other is provided with a series of openings constituting a passage to the annular space between the filter walls.

5. A filter unit comprising an annular filter bag, a lower supporting ring in the bottom of the bag, an upper supporting ring inserted in the mouth of the bag, means for securing the walls of the bag to the upper ring, a groove in the lower side of the upper ring, a groove in the upper side of the lower ring and a spacing element inserted between the two rings and in the grooves.

6. A filter unit comprising an annular filter bag, a lower supporting ring in the bottom of the bag, an upper supporting ring inserted in the mouth of the bag, means for securing the walls of the bag to the upper ring, a groove in the lower side of the upper ring, a groove in the upper side of the lower ring and a spacing element inserted between the two rings and in the grooves, said spacing element comprising a wire extending from one groove to the other progressively and at spaced intervals around the filter unit.

7. A filter comprising a settling chamber and a cap therefor provided with inlet and outlet passages, one of said passages being in the form of an annular groove on the under side of the cap, a filter unit comprising an annular filter element having an annular opening and means for positioning the opening of the filter element over the annular groove and holding it against the cap independently of the walls of the chamber.

8. A filter comprising a settling chamber and a cap therefor provided with inlet and outlet passages, the outlet passage being in the form of an annular groove on the under side of the cap, means for clamping the cap to the chamber, a filter unit comprising an annular filter bag, and means including said clamping means for positioning the mouth of the bag over the outlet groove and resiliently holding it against the cap.

9. A filter comprising a settling chamber and a cap therefor provided with inlet and outlet passages, the outlet passage including an annular groove on the under side of the cap, a rod secured to the bottom of the chamber and extending upwardly through the cap, a filter unit within the chamber comprising an annular filter bag concentric with the rod and means for supporting the bag from the rod with its mouth over the outlet groove in the cap, said means comprising a resilient spider supported from the rod, a nut provided at the upper end of the rod for clamping the cap to the chamber, the spider being so positioned on the rod that as the cap is clamped upon the chamber it first engages the filter unit and forces it down against the action of the spider to resiliently hold the filter unit against the cap.

10. A filter comprising a settling chamber and a cap therefor provided with a passage in the form of an annular groove on the underside of the cap, an annular filter element, and means for positioning the filter unit over the outlet groove and holding it against the cap adjacent both the inside and outside edges of the groove.

11. A filter comprising a settling chamber and a cap therefor provided with inlet and outlet passages, one of said passages being in the form of an annular groove on the underside of the cap, an annular filter element comprising concentric cylindrical walls of the filter material having an annular space therebetween and being closed at one end and open at the other, and means for positioning the open end of the filter over the annular groove and resiliently holding it against the cap.

12. A filter comprising an annular filter element having an annular opening, a container therefor comprising a cup-shaped element and a cooperating cap adapted to fit over said element, said cap being provided with inlet and outlet passages, and means independent of the walls of said cup-shaped container element for supporting the filter element in engagement with the cap with the opening in the filter registering with one of the passages in said cap

AXEL W. KOGSTROM.